Sept. 28, 1965  R. E. VAGO  3,208,336
NAVIGATIONAL APPARATUS
Filed March 28, 1963  6 Sheets-Sheet 1

INVENTOR
Robert E. Vago
BY James A. Lamb
PATENT AGENT

Fig. 2.

Sept. 28, 1965 R. E. VAGO 3,208,336
NAVIGATIONAL APPARATUS
Filed March 28, 1963 6 Sheets-Sheet 3

INVENTOR
Robert E. Vago
BY James A. Lamb
PATENT AGENT

Sept. 28, 1965  R. E. VAGO  3,208,336
NAVIGATIONAL APPARATUS
Filed March 28, 1963  6 Sheets-Sheet 4

Sept. 28, 1965　　　　　R. E. VAGO　　　　　3,208,336
NAVIGATIONAL APPARATUS
Filed March 28, 1963　　　　　　　　　　　6 Sheets-Sheet 5

Fig. 7.

INVENTOR
Robert E. Vago
BY James A. Lamb
PATENT AGENT

Fig. 8.

United States Patent Office 3,208,336
Patented Sept. 28, 1965

3,208,336
NAVIGATIONAL APPARATUS
Robert E. Vago, Bell's Corners, Ontario, Canada, assignor to Computing Devices of Canada Limited, Ottawa, Ontario, Canada
Filed Mar. 28, 1963, Ser. No. 269,236
10 Claims. (Cl. 88—24)

This application is a continuation-in-part of United States application Serial No. 257,507 filed February 11, 1963, now abandoned.

The invention relates to improved navigational apparatus, and in particular it relates to improved navigational apparatus having a pictorial map display.

The navigational apparatus of this invention is particularly suitable for use in aircraft and it is described hereinafter with reference to aircraft. It will, however, be understood that the apparatus is adaptable for use in any craft moving over the earth's surface.

Apparatus is available which provides signals continuously representing the position of an aircraft in flight. Such apparatus is well known. For example, doppler or inertial navigational computer equipment may supply such signals. Depending on the equipment, the signals may represent distance and direction travelled from a starting point or a reference point, or may represent distance in two cardinal directions with respect to a reference, or may represent latitude and longitude changes.

Navigational apparatus which uses such signals as inputs to provide a form of pictorial representation of aircraft position is also known. One such prior apparatus uses a plotting table to which a map is fixed and a moving stylus traces out the aircraft position. This is, of course, bulky, heavy, and not convenient to use. It cannot be used directly by the pilot, and it requires an awkward change of maps when the aircraft passes the position represented by the edge of the map.

Another prior apparatus uses a small scale transparency representing a portion of a topographic map and projects the image of the transparency, or a portion thereof, onto a screen through an enlarging optical system. This provides a much more convenient arrangement. The aircraft position is indicated by a stationary marker on the screen, and the transparency is moved in accordance with change in aircraft position as represented by the aforementioned input signals. Thus the marker indicates the position of the aircraft during flight.

In the last mentioned prior apparatus, each transparency is a separate frame on a film strip, and each frame represents a portion of a Lambert conical map projection overlapping by a predetermined amount at the ends and sides the map portions represented by frames depicting adjacent map areas. Each frame is arranged so that the meridian that is centrally located in the frame is vertical, that is the meridian extends across the middle of the frame from the top to the bottom side making a right angle with the top and bottom sides. Because of this arrangement there is no converging error where the central meridian lies in each frame. However, convergency error accrues towards the ends of the frame and the representation of aircraft position towards the frame ends is not as acurate. It would, of course, be desirable to avoid or to compensate for convergency error.

When a frame is moved so that the side or end of the frame as projected approaches the aircraft position marker on the screen, the film strip must be moved to bring the frame representing an adjacent map area into position. In the prior apparatus an operator is required to make the change in the film strip from one frame to another. The operator studies an index or chart showing the layout of all the frames on the film strip with the map areas they represent. Knowing the frame in the projector at that time, the operator determines the code of the frame representing the area into which the aircraft is travelling. Then the operator manipulates a film control to bring the desired frame into the projector system, and operates further controls to position the projected image with respect to the aircraft marker. If there is some reference point on the projected map image in the common overlap area, i.e. the area common to both frames involved in the change, and if this reference point when projected is in close proximity to the aircraft marker at the time of the frame change, then the operator can position the second frame by moving it until the aircraft marker and the projected reference point are in the same relative positions as in the display of the first frame just prior to the change. However, if there is no convenient reference point it is difficult to position the second frame correctly. This is a disadvantage of the prior apparatus. In addition, the changing of frames requires the attention of an operator for some time and is consequently not desirable. It is particularly inconvenient for use by the pilot of an aircraft. Thus, it is apparent that a navigational apparatus of this general type which changes frames automatically would be desirable.

It is therefore an object of this invention to provide an improved navigational apparatus which displays automatically and substantially continuously a topographic representation of present position.

It is another object of the invention to provide an improved navigational apparatus for displaying a substantially continuous conic topographic representation of present position compensated for errors in convergency.

It is another object of the invention to provide in a navigational apparatus having means for projecting a map display to show present position and using a film strip with a plurality of frames representing contiguous portions of a map area, means for automatically changing frames when required.

It is another object of the invention to provide a navigational apparatus of novel design having means to display substantially continuously a representation of present position and means to receive a setting of a destination position, and which further provides means for indicating the relationship between present position and destination position.

It is a final object of the invention to provide in an improved navigational apparatus having a map display showing present position and means for setting into the apparatus a destination position, means for causing the map display to move automatically from the present position to the destination position to enable the map representation of the desired track to be scanned.

These and other objects and advantages of the invention will appear from the following description taken in conjunction with the accompanying drawings, in which.

Briefly, the present invention is for a navigational apparatus for use in a piloted craft and having a display unit comprising a frame, a light projector mounted at one end of the frame, a display screen mounted at the other end of the frame in the projector light path, a turntable mounted to the frame between the projector and the screen having a light passing aperture therethrough, drive means mounted to said frame and engaging said turntable for orienting said turntable in a predetermined orientation, a film transport mounted to the turntable and having back and forth movement in a first direction and a light passing aperture therethrough, a film strip holder carried by the film transport and including a film driving sprocket having an axis parallel to said first direction and being rotatable on said axis for moving a film in a second direction at right angles to the first direction, a first drive means mounted to the turntable and connected to the film transport and being responsive to a signal corresponding to a component of movement of the craft in a third direction for driving said film transport, a second drive means mounted to the film transport and connected to the film driving sprocket and being responsive to a signal corresponding to a component of movement of the craft in a fourth direction at right angles to the third direction for driving said sprocket, a first and a second switch mounted to the turntable and operable upon movement of the film transport in the first direction to a forward and a backward limit respectively, means actuated by the first switch energizing the first drive for a predetermined movement at an accelerated rate, and means actuated by the first switch energizing the second drive for a predetermined movement at an accelerated rate.

The film strip holder preferably holds a strip of film having a plurality of frames in abutting end to end relationship. Each frame is a transparency representing a part of a map area. A portion of a frame is positioned in the projector light path projecting a map image on the screen. The film strip and consequently the map image are moved by the first and second drive means in accordance with movement of the craft to show craft position.

The apparatus also includes means receiving a signal representing earth miles travelled and deriving therefrom a signal representing map miles travelled, means receiving a signal representing true track and deriving therefrom a signal representing map grid track, means converting the signals representing map miles and map grid track into signals representing north-south and east-west components of craft movement in map miles, and means applying these latter signals to the first and second drive means for positioning the film strip.

In a preferred embodiment, a destination position may be set into the apparatus. Two signals are resolved from the destination position representing a north-south component and an east-west component. These resolved signals may be added respectively to the signals representing north-south and east-west components of craft position to energize the first and second drive means causing the film strip to move to project on the screen an image showing a map representation of the desired track to destination.

Figure 1:
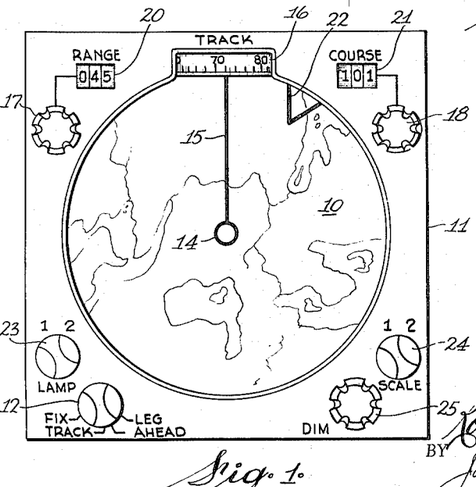
FIGURE 1 is a front view of a typical display unit used in a navigational apparatus in accordance with the invention.

Referring first to FIGURE 1, there is shown a front view of a typical display unit used in the navigational apparatus of this invention. This view shows the display unit as it would be seen by the pilot, navigator or other operator. A general description of the display unit and the controls thereon will be given first to provide a background for the more detailed description which follows. A screen 10 occupies the center portion of a front panel 11 of the display unit. An image of a portion of a topographic map is projected onto screen 10 from a film strip having a plurality of frames each representing a part of a map. The apparatus has four operational modes which may be selected by the mode knob 12, and the normal mode is the "track" mode. When operating in the "track" mode, a small fixed circle 14 on screen 10 represents the present position of the aircraft, and the fixed line 15 represents aircraft track. As the aircraft moves over the terrain the map image moves correspondingly along track line 15 past the present position circle 14. The frames in the film strip change automatically when required to provide a substantially continuous display. The track being made good is shown on track indicator scale 16. Thus the pilot or other operator always has before him a map display showing aircraft present position with aircraft track indicated above.

Another mode of operation is the "leg" mode. When this mode is selected by knob 12, a destination position may be set into the apparatus. In other words a desired leg of a flight can be established to the terminal point or destination at the end of the leg. The destination position may be set in by means of a separate push-button unit (not shown) which has push buttons for selecting predetermined destination signals, or it may be set in using a range knob 17 and a course knob 18. The range or distance to the leg destination is shown on range counter 20, and the desired course or track to the leg destination is shown on counter 21. When this destination has been set in, the knob 12 can be turned to place the apparatus once more in the "track" mode. Then the range and course counters 20 and 21 are moved by the apparatus to show the remaining distance and course or bearing to the destination. In addition, when a destination has been set in and the apparatus is in the "track" mode, a movable indicator or pointer 22 indicates the desired track to the destination. In other words, the pointer 22 indicates a desired track, and by displacement from track line 15, it also shows track error. To make good a track to the destination requires only that the aircraft be steered so that the track error pointer 22 and the aircraft track line 15 are coincident.

Another mode of operation that can be selected by knob 12 is the "look ahead" mode, or more simply the "ahead" mode. When this mode is selected, and when a destination position has been set into the apparatus, the map display on the screen 10 automatically advances at an accelerated rate along the desired track to the destination. This provides the pilot or other operator with an opportunity to look at the terrain, as shown by the map, over which the desired track lies. If it appears desirable, knobs 17 and 18 can be rotated to slew the projected map image around to look at any particular part. The film strip automatically moves and changes frames as required.

A "fix" mode is provided and may be selected by the mode knob 12. This mode is provided to correct positional errors in the display. If a fix is obtained and the position of the fix does not correspond to the position shown on the map display by the present position circle 14, then the "fix" mode is selected and knobs 17 and 18 operated to position the display in accordance with the position of the fix. The apparatus is then returned to its "track" mode by movement of knob 12. In any of the modes other than the "track" mode, the input signals representing the aircraft movement are fed into a memory and stored. When the "track" mode is again selected, the stored signals are taken from the memory to move the projected map image so that the display will again show the position of the aircraft.

Other control knobs are provided on panel 11. The lamp knob 23 enables the operator to select one of two alternate lamps for the projector in the display. These lamps provide the light for the display, and if one should fail the other can be selected to restore the light and maintain the display.

The scale control knob 24 selects one of two optical magnifications for the projector. Thus the magnifiication can be changed to meet different requirements. It has been found that scales of 1:500,000 and 1:1,000,000 are satisfactory for most requirements, although other scales can be used. The 1:500,000 scale enables a pilot to distinguish topographical detail for low altitude work. In a prefered aparatus the scale 1:500,000 provides a viewing radius of about 17 nautical miles on screen 10, and the 1:1,000,000 scale provides a viewing radius of about 34 nautical miles.

A control knob 25 is provided to vary the level of the projector light and consequently the brightness of the display image. Thus the brightness may be adjusted in accordance with varying ambient light conditions. An automatic light control, responsive to ambient light, could, of course, be incorporated.

It will be noted that the display, as described, is slaved to aircraft track. That is, the aircraft track is towards the upper part of the display of FIGURE 1. This is normally the most convenient display for the pilot. It is possible, however, to orient the map display to North. In other words, provision is made to orient the map display with North represented by the upper part of the display as seen in FIGURE 1. A spring loaded switch is incorporated in knob 18 for changing the orientation.

In the apparatus of this invention, having an automatic continuous projected map display, any type of map projection may be used. The apparatus could be readily adapted for use with various such projections. It is, however, preferred to use a Lambert conformal conic projection. Such projections are well known and will be described only briefly to provide an understanding of the frame arangement in the film strip.

Figure 2:
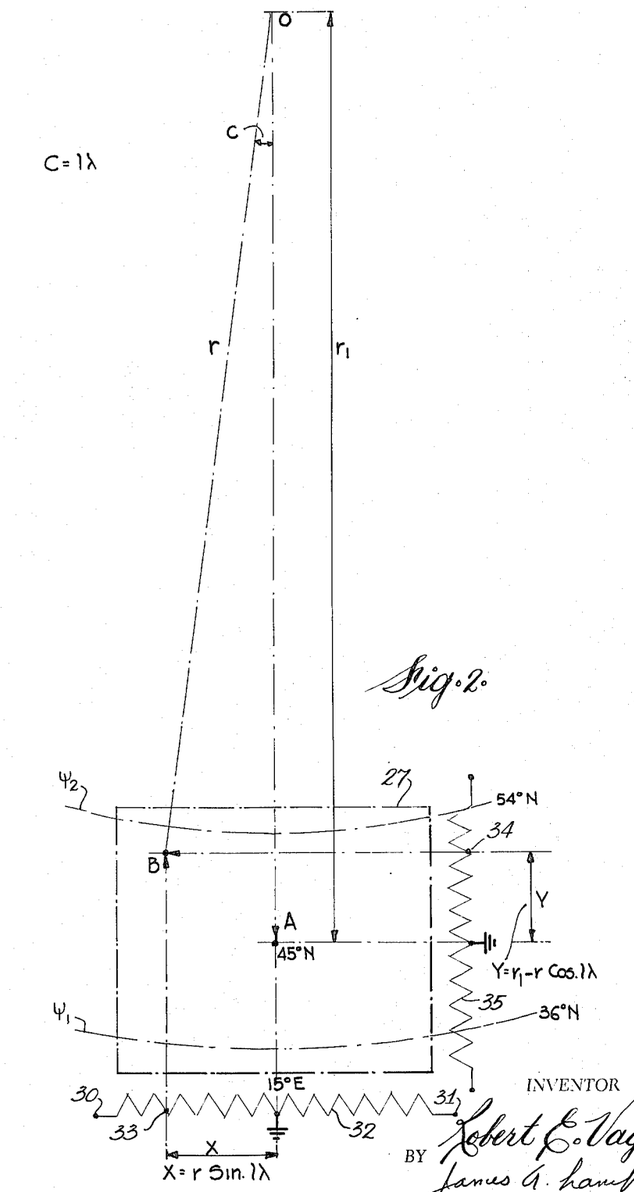
FIGURE 2 is a schematic representation of a Lambert conformal conic projection useful in explaining the operation of the apparatus.

In FIGURE 2, a schematic representation of a Lambert conformal conic projection is indicated. Such map projections transfer the spherical surface of the earth to a flat map surface by virtue of a cone cutting the earth. The cone is arranged to cut the earth at two parallels of latitude commonly referred to as a lower standard parallel of latitude $\psi_1$ and an uper parallel of latitude $\psi_2$. Certain parallels of latitude with certain separations have become more or less accepted as normal or customary in the making of these conic projections. For example, in a 1:500,000 projection the latitudes of 36° N. and 54° N. are often used as shown in FIGURE 2. In the drawing 0 represents the point of convergency of the meridians of longitude and A represents a point on the parallel of latitude which is conveniently midway between the standard parallels $\psi_1$ and $\psi_2$. The block 27 represents a map area of interest, and the point A is chosen at a convenient longitude near the middle of the block 27. Using A as a reference, the position of any point B on the map area 27 can be represented in terms of two coordinates X and Y as follows:

$$X = r \cdot \sin C \text{ map miles}$$

$$Y = r_1 - r \cdot \cos C \text{ map miles}$$

where $r$ is the distance in map miles from the point 0 to the point B,

C is map convergency, and $C = l\lambda$, $l$ is a constant having a value depending on the particular parallels used as standard parallels. For 36° and 54° parallels = 0.710105, $\lambda$ is change in longitude in degrees, and $r_1$ is the distance in map miles from the point 0 to the point A. This is a fixed distance depending on the standard parallels and their separation.

All the preceding information including the equations relating to Lambert conformal conic projections are well known in the art.

The values X and Y may be represented as voltage signals as indicated in FIGURE 2 by way of example. If a positive and negative voltage were applied to terminals 30 and 31 of resistance 32 having a grounded centertap, then the voltage available at 33 could represent X. Similarly a voltage available at tap 34 on resistance 35 could represent Y.

Figure 3:
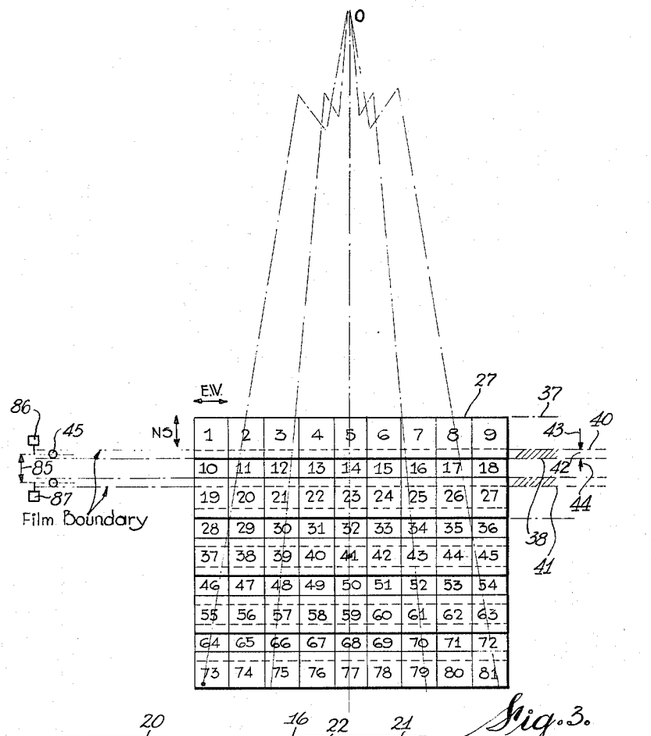
FIGURE 3 is a schematic representation showing a typical layout of frames in a film strip used in the invention with respect to a map area.

Referring now to FIGURE 3, there is shown a schematic view of the layout of the frames representing portions of the map area 27 of interest. The block 27 is divided into a series of smaller parts or areas designated by the numbers 1 to 81 in FIGURE 3. There may, of course, be more or less than 81 areas in a block. The parts are arranged in rows and columns. Each of the designated 81 areas represents a part of a topographic map photographed as one frame on a film strip. Thus the strip of film would have on it 81 frames representing the map area in block 27. The frames are positioned with their centres spaced at a fixed predetermined distance so that on the film strip there is substantially no separation and no overlap at the ends of adjacent frames. In effect, therefore, the frames 1–9 represent a continuous strip, frames 10–18 represent a continuous strip, and so on, and there is no overlap or separation on the film strip between frames 9 and 10 or between frames 18 and 19, etc. The continuous strips are aranged in nines in FIGURE 3, that is they have a period of nine.

Consider for the moment an aircraft flying in an area represented by frame 6 in an east-west or EW direction as indicated in FIGURE 3, towards an area represented by frame 7, there is no interruption or discontinuity of display as provided by the moving film when the boundary or junction of frames 6 and 7 is passed. However, if the aircraft is flying in a north-south or NS direction towards an area represented by frame 15, then when the boundary between areas 6 and 15 is reached the film would have to be moved from the bottom of frame 6 to the top of frame 15 (a distance of 9 frames along the film strip). This film movement causes a momentary interruption of the display.

Because of the interruption when a frame boundary is reached in the display resulting from NS aircraft movement, it is convenient to have an overlap between areas represented by adjacent NS frames. This NS overlap is shown in FIGURE 3. The frames 1–9 cover a strip of map area having NS boundaries defined by 37 and 38. Similarly the frames 10–18 cover a strip of map having NS boundaries defined by 40 and 41. Consequently there is a common map area appearing in both series of frames and indicated as overlap area 42 between arrows 43 and 44. This overlap area is the same between succeeding series of frames representing adjacent NS map strips. The amount of overlap is chosen so that on any frame it will provide a full display when projected onto the display screen. In other words, a portion of the film strip of the size of circle 45 (FIGURE 3) will project onto the display screen an image that will just fill the screen. The diameter of circle 45 corresponds to the overlap 42 in frames representing adjacent NS map portions. Thus, when the film strip is being moved to change the projected image from one frame to another representing an adjacent NS map portion, just before and just after the change the same image will be shown—one from one frame and one from the other—and each image will fill the display without showing the edge of the frame.

By way of example, a film strip for use in the apparatus of this invention, found to be satisfactory, was made using 35 mm. colour film to photograph a Lambert conformal conic projection (scale of projection 1:500,000) at a reduction of about 20:1. An area of about 1800 nautical miles by 1800 nautical was represented on 180 frames. When in the projector, the portion of the frame in use is optically magnified by a factor of about 20:1 to provide a map display in which the scale is 1:500,000. The display has been found to have good image resolution. By reducing the magnification to 10:1 the display has a scale of 1:1,000,000.

Figure 4:
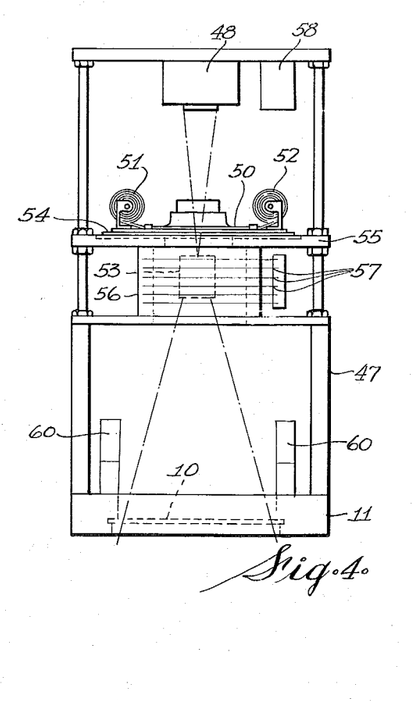
FIGURE 4 is a greatly simplified top view of a display unit used in apparatus in accordance with the invention.

In FIGURE 4 there is shown a simplified top view of the display unit. This drawing has many parts omitted for simplicity and is used to show the general layout of the main parts and to indicate the light path. A frame 47 is fastened to the front panel 11, extending rearwardly, and a projector system 48 is mounted at the rear. The projector system 48 directs light through a portion of a strip of film 50 extending between spools 51 and 52, through a lens system 53 onto screen 10, as indicated. The film spools 51 and 52 are supported from a turntable 54 rotatably mounted in a bracket 55 on frame 47 as will be described in connection with FIGURE 5. A slip ring assembly 56 is mounted for rotational movement with turntable 54. A set of brushes 57 mounted to frame 47 engage the slip rings on assembly 56 in order to provide electrical connections to equipment mounted on turntable 54 as will be described. A blower 58 is provided for cooling the projection system, and servo mechanisms 60 are provided to move or position the display.

Figure 5:
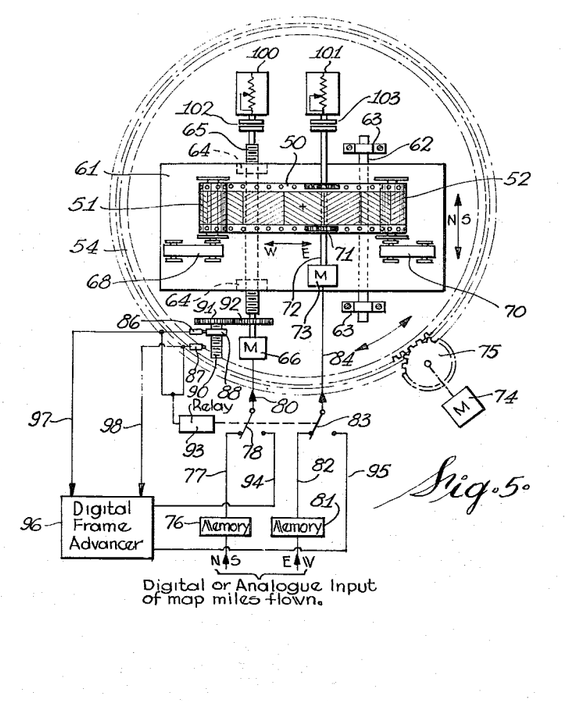
FIGURE 5 is a top view showing the turntable used in the display unit, and the associated parts and equipment.

Referring now to FIGURE 5, the turntable 54 is shown from the top in more detail with its associated parts. Mounted to the turntable 54 is a film transport 61 which is movable back and forth in the direction marked NS on the drawing. Towards one end of transport 61 a shaft 62 is fixed. This shaft projects on either side of the transport and is slidably supported by brackets 63 secured to turntable 54. Towards the other end of transport 61 are threaded nuts 64 fixed to the transport 61, and a threaded rotatable shaft 65, parallel to shaft 62, engages the nuts 64. The threaded shaft 65 is supported from transport 61 for rotational movement driven by a reversible motor 66. When motor 66 is energized it drives shaft 65 which turns within nuts 64 causing the film transport to move in the direction marked NS. The shaft 62 supports and guides the transport to ensure only movement in the NS direction.

The spools 51 and 52 are mounted to the film transport 61 on arms 67 with the film 50 extending between the spools. Tensioning devices 68 and 70 are mounted to film transport 61 and are connected to spools 51 and 52 respectively. The tensioning devices 68 and 70 are oppositely connected and designed to keep a substantially constant tension on the film strip regardless of the amount of film on each spool. A sprocket 71 engages the edge holes in film strip 50 and is rotatably supported by shaft 72. A reversible motor 73 is connected to shaft 72 for driving the film back and forth from one spool to the other in an EW direction. The drive for sprocket 71 should have as little backlash as possible.

A turntable drive motor 74 is provided for driving a toothed wheel 75 which engages the turntable 54. The orientation of the turntable in FIGURE 5 is in a NS direction. The motor 74 may be driven in response to a signal representing true track to align or orient the track so that it is always directed towards the top of the display, i.e. track oriented.

It will be apparent that an alternative structure may be used to achieve a desired orientation. For example, the film transport may be fixed to the frame rather than mounted on a turntable. This has the advantage of eliminating the slip ring assembly associated with the turntable. The orientation is then achieved by having a prism assembly in the light path which may be rotated to cause a rotation of the projected image.

Thus it will be seen that light from the projector passes through a portion of film strip 50 (and through apertures provided in film transport 61 and turntable 54 to permit passage of the light) to provide a map display image. As the aircraft moves the motors 66 and 73 are driven to provide movement of the film in accordance with aircraft movement, and the motor 74 is driven to maintain the required orientation of the turntable 54 and the film strip carried thereby. The transport drive motor receives its control drive signal from a NS input through a NS memory 76, a conductor 77, a switch 78 and conductor 80. The film drive motor 73 receives its control drive signal from an EW input through an EW memory 81, a conductor 82, a switch 83, and a conductor 84.

It will be recalled that when a NS boundary of a frame in the film strip is approached, the film sprocket drive is energized to move the film strip nine frames at an accelerated rate while at the same time the film transport drive is energized to move the film transport to its opposite side at an accelerated rate. This action is initiated by two micro switches mounted to the turntable. The two micro switches are designated 86 and 87, and their position with respect to film position is schematically indicated at the left of FIGURE 3. Suppose the film transport is moving so that a portion of frame 10 is being projected onto the screen and the upper boundary (in FIGURE 3) is being approached. When frame 10 is in a position such that the projected portion (i.e. a portion the size of circle 45) is just within the overlap area, then micro switch 86 is actuated. This causes motor 73 to drive film 50 at an accelerated rate to frame 1, and also causes motor 66 to move the film transport to a position where the frame 1 portion being projected is in the overlap area. Similarly, when the lower boundary of say frame 10 is reached and the display is from a portion in the overlap area, then micro switch 87 is actuated. Thus switches 86 and 87 define limits of movement of the film transport, and the amount of movement is indicated by 85 in FIGURE 3.

Referring now to FIGURE 5, the micro switches 86 and 87 are shown mounted to the turntable 54. The micro switches 86 and 87 are actuated by a travelling nut 88 which rides on a threaded shaft 90. As is known, the travelling nut 88 is restrained from rotational movement but is permitted longitudinal movement along shaft 90. Thus, as shaft 90 rotates, the nut 88 is moved along it. The shaft 90 is rotatably supported from turntable 54 and has a gear 91 secured to one end. Meshing with gear 91 is a gear 92 mounted on shaft 65 for rotation therewith by motor 66. Thus, the position of the travelling nut 88 always has a direct relationship with the position of the film transport 61. The two micro switches 86 and 87 are positioned to define the limits of travel of the film transport 61 as has been described.

Suppose now that the film transport 61 has reached a position that is its limit of movement north and the switch 86 is actuated by nut 88. A relay 93 is operated to move switches 78 and 83 to contact conductors 94 and 95 respectively. While the switches 78 and 83 are in this position, the signals representing NS and EW map miles are stored in the memories 76 and 81. At the same time that micro switch 86 operates relay 93, it also initiates the operation of a digital frame advancer 96 via conductor 97. The digital frame advancer 96 comprises a pulse generator that provides a discrete predetermined number of pulses over conductors 94 and 95, through switches 78 and 83, to motors 66 and 73, respectively. These pulses drive the motor 66 and 73 at a substantially faster rate than they are normally driven in response to aircraft movement and they drive them by an exact predetermined amount. Thus, the motor 66 moves the film carriage to its opposite or in this case its south limit, and the motor 73 moves film 50 by exactly nine frames. When the required number of pulses have been applied to the drives the relay 93 operates to return switches 78 and 83 to their normal position, that is to make connection respectively to conductors 77 and 82. The memories 76 and 81 then feed out the signals stored to bring the position of the film strip up to date.

Likewise, if the movement of the film transport actuates switch 87, relay 93 is operated and the frame advancer 96 has its operation initiated via conductor 98. The operation is the same except that the direction of rotation of motors 66 and 73 is in one direction when the frame advance signals is from conductor 97, and in the opposite direction when the signal is via conductor 98.

Figure 8:
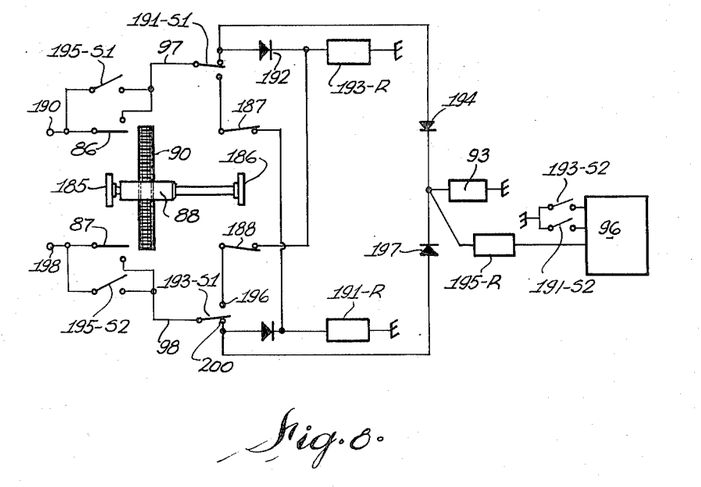
FIGURE 8 is a simplified circuit diagram showing the operation of another portion of the apparatus useful in preventing random operation of the frame advancer.

It is desirable in practice to include means for preventing random operation of the frame advancer 96 during unusual operational maneuvers. For example, if the aircraft should fly into the region represented by a boundary between two adjacent map strips, say the boundary between frames 1 and 10, and should then turn and fly in an EW direction parallel to this boundary, the apparatus should provide the correct display. As another example, if the aircraft should fly in a NS direction to a boundary and initiate a frame change and should then immediately reverse its direction, the apparatus should recognize this and provide the frame for the correct display. FIGURE 8 shows a means for preventing random operation under such unusual maneuvers.

In FIGURE 8, to simplify the diagram, relays with the switches they control are not necessarily shown together but are shown in the most convenient spot in the diagram. To aid in identifying the relays with the switches they control, they are given the same designation number— the relay coil being followed by the letter R and the switch being followed by the letter S.

Referring now to FIGURE 8, the threaded shaft 90 and the travelling nut 88 are shown. The travelling nut 88 has switch operating members or arms 185 and 186, which are shown in the drawing as extended from the nut to indicate engagement of switches 86 and 87 on one side and switches 187 and 188 on the other side with movement of the nut 88. As was previously described, a NS component of craft movement causes motor 66 (FIGURE 5) to drive both the film transport 61 (FIGURE 5) and shaft 90. Suppose the film transport is positioned with the display at a NS boundary, the travelling nut is in a position where arm 185 engages switch 86 and closes it. When switch 86 is closed it completes a circuit between a voltage source at terminal 190, through switch 86, through conductor 97, through a switch 191–S1, and thence through two branch portions. One branch portion is through rectifier 192 and a relay 193–R to ground. The other branch portion is through rectifier 194 where the circuit again divides, one path being through relay 93 to ground and the other path being through relay 195–R to frame advancer 96 and then to ground. A rectifier 197 is placed to block the circuit for flow in a direction away from rectifier 194.

It will be seen that the closing of switch 86 as described above energizes relay 193–R, relay 93, and relay 195–R. The energizing of relay 193–R moves switch 193–S1 to contact 196 to isolate relay 191–R, and also moves switch 193–S2 to ground to complete the circuit through the frame advancer. The relay 93 operates switches 78 and 83 as described in connection with FIGURE 5. The relay 195–R functions as a locking relay and when energized closes switches 195–S1 and S2. This serves to maintain a closed circuit between terminal 190 and conductor 97 after nut 88 with arm 185 moves away from switch 86 during the frame advance.

Considering for the moment that switch 86 has just been closed and the circuit has been established as described above, the frame advancer 96 is placed in an operative condition. A short delay, which, for example, may be of the order of 250 milliseconds, is built into the frame advancer to ensure that all relays have completed their operation. After this delay the frame advancer 96 generates pulses to drive motors 66 and 73 as has been described. As the pulses are generated, the shaft 90 is rotated and nut 88 with arm 185 moves away from switch 86 allowing it to open. The switch 195–S1 is, however, closed and the opening of switch 86 does not affect the circuit. At the moment the frame advance is completed, the travelling nut 88 is positioned with arm 185 just closing switch 87. There is a circuit established from a voltage source at terminal 198 through switch 87 (and also through switch 195–S2), conductor 98, switch 193–S1 contact 196, switch 188, and relay 193–R to ground.

When the frame advancer 96 finishes the frame advance it momentarily provides an open circuit and thereby stops the current flow through relay 195–R and permits switches 195–S1 and 195–S2 to open. The opening of switch 195–S1 stops the flow of current from terminal 190 and de-energizes relay 93. However, there is still a circuit from terminal 198, through switch 87, switch 193–S1, switch 188 and relay 193–R to ground. Thus, switches 193–S1 and 193–S2 do not move. Before frame advancer 96 is permitted to operate again, the switch 193–S2 (or switch 191–S2 as the case may be) must open and then be re-closed.

It will be seen that if the aircraft should turn and fly parallel to a boundary at this time, that is fly in an EW direction, the arm 185 will not move and switch 87 will remain closed. This will keep relay 193–R energized and switch 193–S2 closed, preventing operation of the frame advancer.

Suppose now that the aircraft reverses its direction during a frame advance period initiated by switch 86, the frame advance will be completed with arm 185 just closing switch 87 and then the movement of the aircraft in the reversed direction will cause the travelling nut 88 to move farther towards switch 87. Switch 188 is set to open with a short over-travel of nut 88 past the position where switch 87 is just closed. It has been found that movement of nut 88 corresponding to one-half a nautical mile of aircraft travel is a convenient amount. When the additional one-half mile has been travelled, the arm 186 opens switch 188. This de-energizes relay 193–R so that switch 193–S1 moves to contact 200 and at the same time switch 193–S2 opens. The opening of switch 193–S2 resets the frame advancer 96, and the switching of 193–S1 completes a circuit from terminal 198 through switch 87 to energize relay 191–R, relay 93, and relay 195–R. Thus a frame advance is initiated through switch 87 in a manner similar to that initiated by switch 86 previously described.

In normal flying the aircraft would continue on a course across a boundary between adjacent strips. A frame advance would be initiated for example by switch 86 and would be completed with nut 88 positioned to just close switch 87. As the aircraft continued its normal flight, the nut 88 would be moved away from switch 87 permitting it to open. This would de-energize relay 193–R, move switch 193–S1 to its other contact 200 and open switch 193–S2. The circuit is then ready for the next frame advance.

It will be seen that the arrangement of FIGURE 8 enables the correct display to be shown even if unusual maneuvers are made, such as, for example, flying parallel to a boundary or reversing direction just after a frame advance is initiated.

Referring once more to FIGURE 5, it will be noted that two potentiometers 100 and 101 are connected by disengageable clutches 102 and 103 to shafts 65 and 72, respectively. The potentiometers 100 and 101 are provided to record film strip position. The clutches 102 and 103 disengage during the frame advance operation so that the change in frames does not affect the potentiometer record. The manner in which these potentiometers 100 and 101 are used will be described in connection with FIGURE 7.

Figure 6:
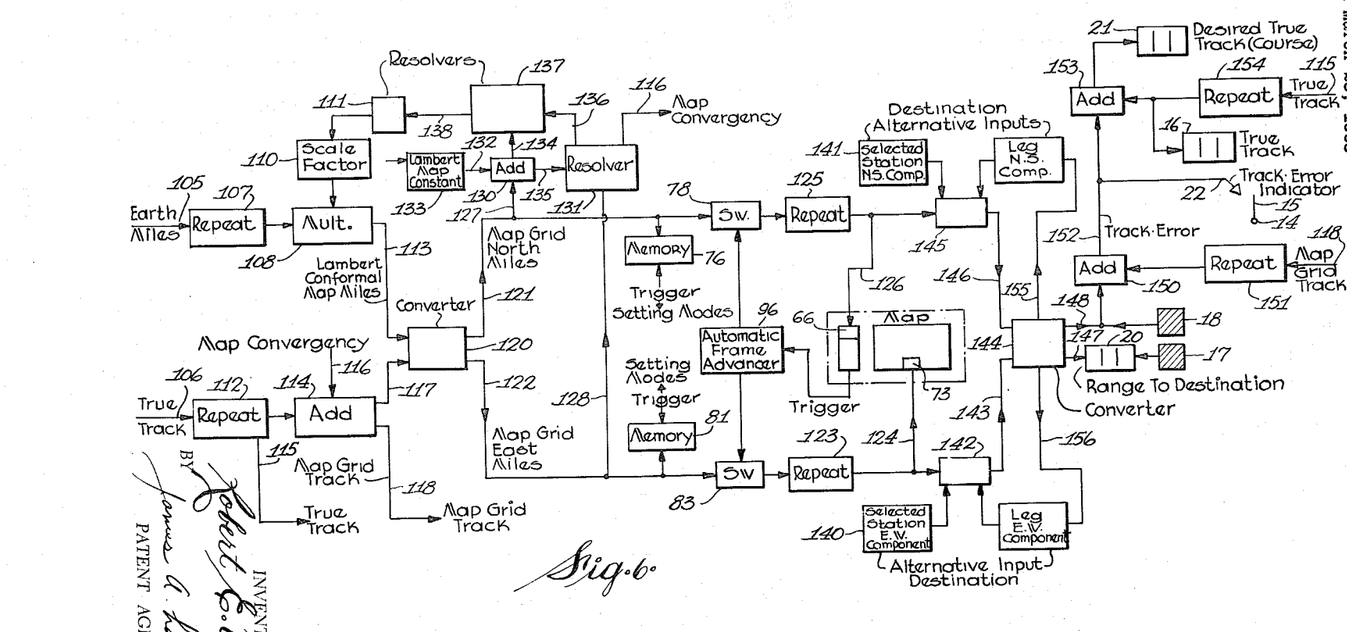
FIGURE 6 is a block diagram showing a navigational apparatus in accordance with the invention.

The navigational apparatus as a whole is best described with reference to FIGURE 6. The two main inputs to the apparatus are indicated at 105 and 106 respectively representing earth miles and true track. It will be apparent to those skilled in the art that a grid track could be used as an input, and true track obtained from it, if desired, by adding map convergency C to the grid track. The earth miles signal at 105 must be transformed to a signal representing map miles before it can be used in moving the map display. The earth miles signal at 105 is passed by a repeater 107 to a multiplier 108. The repeater 107 is included for convenience in installing and removing the equipment, and is not essential for operation as is known in the art. The earth miles signal is multiplied by a scale factor from scale factor unit 110 in multiplier 108. It is known that the scale factor (i.e. a factor relating earth miles and map miles) in a conic projection varies with latitude in some manner. It has been found that with a Lambert conformal conic projection the following relationship provides an accurate scale factor for this transformation $$S.F. = \frac{\cos\left(\frac{\psi_2 - \psi_1}{2}\right)}{\cos\left(\frac{\psi_2 + \psi_1}{2} - \phi\right)}$$

where
$\psi_2$ is the upper standard parallel of latitude in the projection used,
$\psi_1$ is the lower standard parallel of latitude, and
$\phi$ is map latitude.

For any given conformal projection used for preparing the film strip, the upper and lower standard parallels are known and are set into the apparatus prior to using it. The map latitude in degrees is derived in the apparatus to a very close approximation from a map miles to degrees converter or resolver 111 as will be discussed subsequently. Thus the output from multiplier 108 appears on path 113 and is a signal representing map miles i.e. miles on a Lambert conformal conic projection used for the film strip.

The true track signal at 106 is passed by a repeater 112 to an adder 114. The repeater 112 also supplies a true track signal on at 115 to be used in another portion of the apparatus. The adder 114 receives the true track signal from repeater 112 and also receives a signal at 116 representing map convergency C from a source that will be described later. The output signal from adder 114 represents map grid track and is available at 117 and 118.

The signal representing map miles is applied over 113 as an input to a converter 120, and the signal representing map grid track is applied over 117 as another input to converter 120. The converter 120 is of a type often referred to in the art as an $R\theta$ to $xy$ converter or as a range and bearing to rectangular coordinate converter. It is designed to convert from terms of measurement by angle and distance to terms of distance in rectangular coordinates. Such converters are known and the particular type used is not important to the invention. The output from converter 120 is on path 121 and 122 and comprises respectively a signal representing map grid miles in a NS direction ($\Delta NS$), and a signal representing map grid miles in and EW direction ($\Delta EW$).

The signal $\Delta EW$ is applied via 122, switch 83, repeater 123 and path 124 to motor 73 to control the sprocket drive to move the film strip longitudinally. The signal $\Delta NS$ is applied via 121, switch 78, repeater 125 and path 126 to motor 66 to drive the film transport. Memories 76 and 81 store the $\Delta NS$ and $\Delta EW$ signals when the switches 78 and 83 are operated for setting or changing frames or whenever the apparatus is not operating in the "track" mode.

The signals representing $\Delta NS$ map miles and $\Delta EW$ map miles are also applied over paths 127 and 128 respectively to adder 130 and resolver 131. To provide a better understanding of this portion of the apparatus, reference is also made to the representation of a Lambert conformal conic projection shown in FIGURE 2. It will be recalled that $r_1$ is the distance in map miles from the point of convergency of meridians to a point A centrally positioned between the standard parallels of latitude and which is constant for a given projection. It will also be recalled that $r$ is the distance in map miles from the point of convergency to any point B, and C is the map convergency and is equal to $l\gamma$.

Thus a right angled triangle is formed having a side represented by $r_1 \pm Y$ or $r_1 \pm \Delta NS$, having another side represented by X or $\Delta EW$, and having the remaining side represented by $r$. It will be seen that knowing $r_1 \pm \Delta NS$ and $\Delta EW$, and C can be determined by $$C = \tan^{-1} \frac{\Delta EW}{r_1 \pm \Delta NS}$$

Also $r$ can be determined by $$r = \frac{r_1 \pm \Delta NS}{\cos C}$$

Referring once more to FIGURE 6, the adder 130 has signals representing $r_1$, and $\Delta NS$ applied to it over paths 132 and 127, respectively. The value $r_1$ is set into the apparatus by a control 133. The adder 130 adds the two signals applied to it providing an output signal $r_1 \pm \Delta NS$ at output paths 134 and 135.

The resolver 131 has a signal representing $\Delta EW$ applied to it via 128 and a signal $r_1 \pm \Delta$ applied to it via 135. Resolver 131 solves the equation $$C = \tan^{-1} \frac{\Delta EW}{r_1 \pm \Delta NS}$$

and provides a signal representing map convergency C at output paths 116 and 136. The path 116 provides the signal to adder 114 as was previously mentioned, and path 136 applies the signal representing C to resolver 137.

Resolver 137 has two inputs, one representing C and one representing $r_1 \pm \Delta NS$. Resolver 137 solves the equation $$r = \frac{r_1 \pm \Delta NS}{\cos C}$$

to provide an output signal in terms of map miles at 138. The signal for all practical purposes is equivalent to a latitude in map miles and this signal is applied to converter 111 over path 138. The converter 111 changes the signal $r$ to one representing latitude in degrees for scale factor unit 110 as was previously discussed.

Thus signals are available for driving motors 66 and 73 to position the film strip and accurately depict aircraft present position. When a NS boundary of the film is reached the automatic frame advancer 96 automatically changes frames as was described in connection with FIGURE 5. An automatic and substantially continuous display of present position is provided. The only adjustment required may be to correct the position when necessary.

As was previously mentioned, the apparatus has other modes of operation than the normal "track" mode. Provision is made to set a destination into the apparatus and this can be done by a separate push button control or by the controls provided on the front panel. Considering first the use of a push button control, it will be recalled from FIGURE 2 that X and Y values of any given position or station calculated and signals representative of these X and Y values (i.e. EW and NS signals) developed. These may be applied to the apparatus by a push button unit indicated in FIGURE 6 by blocks 140 and 141. Thus adder 142 receives a signal representing $\Delta EW$ repeater 123 and a signal representing the X or EW component of a selected station, and provides a summed output over path 143 to a converter 144. Similarly, adder 145 receives a signal representing $\Delta NS$ from repeater 125 and a signal representing Y or the NS component of a selected station, and provides an output over path 146 to converter 144. The signals on paths 143 and 146 represent the EW and NS component distances in map miles from a reference to the destination, and converter 144 converts these to a range and bearing. Converter 144 is a double purposes converter or double ended converter which performs $xy$ to $R\theta$ conversion or performs $R\theta$ to $xy$ conversion. For the moment only the $xy$ to $R\theta$ conversion is considered. The distance part of the output appears at 147 and is used to drive a range counter 20 which shows range to destination. The bearing portion of the output appears at 148 and is applied to an adder 150 as one input. The other input is a map grid track signal obtained from adder 114 over path 118 and through repeater 151. The adder 150 provides at 152 a signal which is the difference of the two input signals and represents track error. The track error signal is used to position pointer 22 (FIGURE 1) and is also applied as one input to an adder 153. A true track signal from repeater 112 via path 115 and a repeater 154, is used to drive the true track indicator 16 (FIGURE 1) and is also applied as a second input to adder 153. The output from adder 153 is the desired true track, i.e. true track (course) to destination, and is used to drive counter 21 (FIGURE 1).

It will be recalled from FIGURE 1 that when the apparatus is in the "leg" mode, the range 17 and the course knob 18 may be manipulated to set in a desired destination. The manner in which these knobs 17 and 18 operate to set in a destination is shown in FIGURE 6. The knob 17 and 18 adjust signals applied to converter 144 which acts as an $R\theta$ to $xy$ converter supplying signals on 155 and 156 representing NS and EW components of the change. These signal components are applied to leg component blocks 157 and 158 to alter them to provide the required output signal to adders 145 and 142. The leg component blocks may, in practice comprise potentiometers whose sliders are positioned in accordance with signals on 155 and 156 to provide the required leg destination output signals to adders 145 and 142. The operation is then the same as when selected station component blocks 141 and 140 were used. The "leg" set mode is completely independent of map motion.

Figure 7:
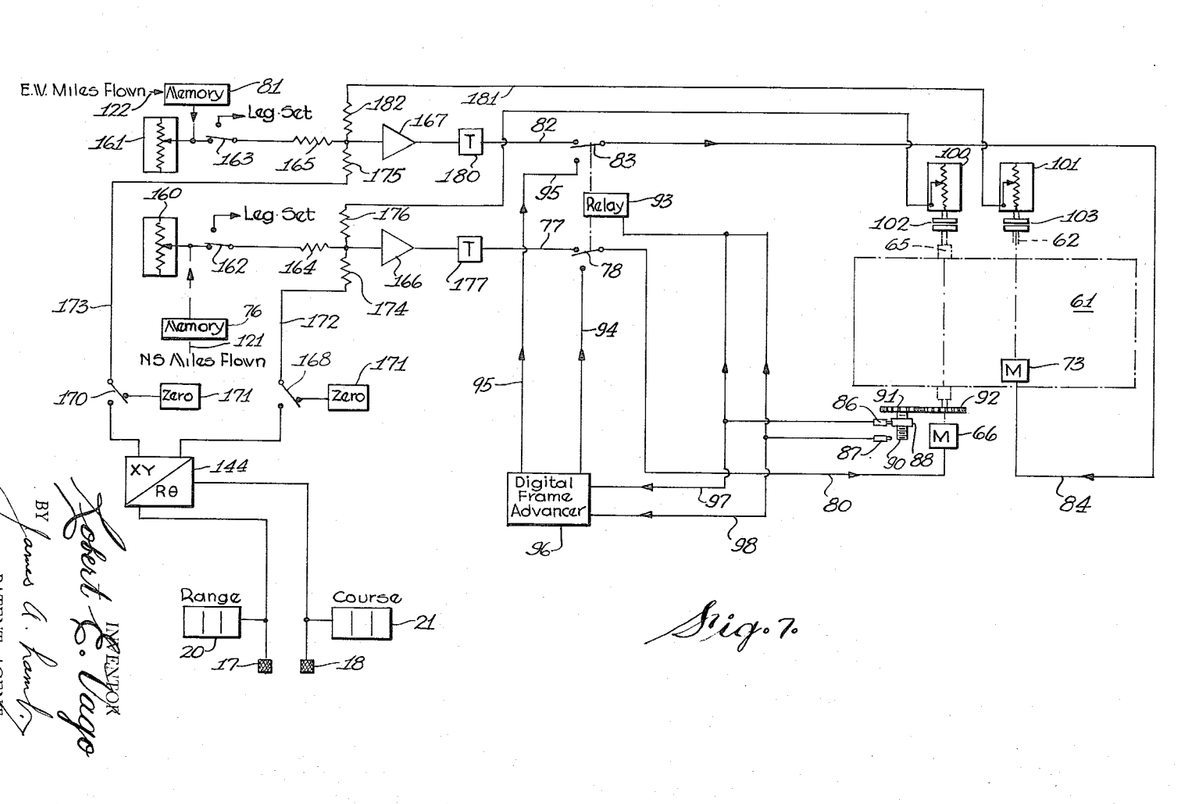
FIGURE 7 is a simplified circuit diagram showing the operation of portions of the apparatus.

Referring now to FIGURE 7, there is shown a simplified schematic circuit diagram which will provide a better understanding of the functioning of the apparatus in the different operational modes. In the "track" mode, signals representing NS map miles and EW map miles are on 121 and 122 respectively and are applied to memories 76 and 81. These signals drive the sliders of potentiometers 160 and 161 to position them in accordance with the changing positional components. Thus the voltages picked off by the sliders of potentiometers 160 and 161 represent aircraft NS and EW position components. These voltages are applied via switches 162 and 163 and resistances 164 and 165 to the inputs of amplifiers 166 and 167, respectively. The switches 168 and 170 are in a position to supply a zero voltage from reference sources 171 over conductors 172 and 173 and resistances 174 and 175 to the inputs of amplifiers 166 and 167, respectively. There is, therefore, in a state of rest, a zero voltage at the input of amplifiers 166 and 167.

Considering first a change in the NS signal, this causes the slider of potentiometer 160 to be moved to a new position and it results in a change of voltage at the input of amplifier 166. In other words, an error voltage is developed across resistances 164 and 176, and this error voltage is amplified by amplifier 166 and applied via a transducer 177, a switch 78 and conductor 80 to drive motor 66. The transducer 177 is included to change an analogue input to a digital output. It is preferred to use a digital drive for motor 66 (and also for motor 73) to aid in accurate positioning of the film and also so that a digital form of frame advancer (advancer 96) can be used to achieve an accurate frame change. Consequently transducer 177 is included. Clutch 102 is engaged and consequently the slider of potentiometer 100 is moved by motor 66. The slider picks off a new voltage which is applied over conductor 178 and resistance 176 to the input of amplifier 166. The motor 66 is driven until the voltage from potentiometer slider 100 reduces the error voltage to zero. Thus a servo loop is formed including motor 66 whereby a change in the voltage representing NS component of aircraft movement causes an error voltage which drives motor 66 to reduce the error voltage. The film is thus positioned in an NS direction by the signal representing NS aircraft movement.

Similarly, for a change in the EW signal, the slider of potentiometer 121 is moved to change the voltage at the input of amplifier 167. This voltage change represents an error voltage which is amplified by amplifier 167 and is applied over transducer 180 as a digital, signal, switch 83, conductor 84 to drive motor 73. As clutch 103 is engaged, the slider of potentiometer 101 is repositioned, changing the voltage on conductor 181 and resistance 182 to reduce the error voltage to zero. Thus the film is positioned in an EW direction by motor 73 in accordance with the EW component of aircraft movement. The micro switches 86 and 87 function to automatically change frames when necessary as was previously described.

The operation of the apparatus in the "leg set" mode was described in connection with FIGURE 6. When in this mode the switches 162 and 163 of FIGURE 7 make the setting independent of map movement.

In the "look ahead" mode, assuming that a leg destination has been set into the apparatus, the switches 168 and 170 are operated to connect conductors 172 and 173 to converter 144. At the same time the NS and EW signals are retained in memories 76 and 81 so that the sliders of potentiometers 160 and 161 remain stationary. The potentiometers remain in a position representing the position at which the "look ahead" mode was selected. The destination position set in, as shown by range counter 20 and course counter 21, is converted in converter 144 into a NS and an EW component, and these components are applied respectively over conductors 172 and 173 to create an error voltage at the inputs of amplifiers 166 and 167. As before, these error signals drive the film strip at an accelerated rate (i.e. at a rate faster than the rate at which the film is driven in response to aircraft movement), to change the voltages a the sliders of potentiometers 100 and 101 to reduce the error voltage. The frame advance mechanism operates automatically when required in the manner previously described. When the film strip is positioned to display the destination position, the error voltage is reduced to zero and the film drive stops. The destination position, and consequently, the film position, can be altered by knobs 17 and 18 so that the display may be moved to any part in the filmed map area. When the apparatus is returned to the "track" mode, the switches 168 and 170 are returned to apply a zero signal over conductors 172 and 173, and the memories 76 and 81 again position the sliders of potentiometers 160 and 161 in accordance with current aircraft position. The film is driven to achieve a zero voltage at the inputs to amplifiers 166 and 167 at which time the display again shows aircraft present position.

The "fix" mode is quite similar to the "look ahead" mode in that an amount of look ahead is applied to drive the film to correct the displayed position. The difference between the two modes is that in the "fix" mode, the memories 76 and 81 are actually altered so that the corrected position is retained when the "track" mode is again selected.

It is believed that a preferred embodiment of the navigational apparatus has been described, and that it functions to provide an automatic and accurate display of the the present position of an aircraft or other piloted craft. The apparatus includes provision for setting in a destination and provides a continuous indication of the position of the destination relative to present position, and also includes means for causing the display to move from present position along a desired track to the destination position.

I claim:

1. A navigational apparatus for use in a piloted craft comprising, a frame, a light projector mounted at one end of said frame, a display screen mounted at the other end of said frame in the projector light path, a film transport having back and forth movement in a first direction and a light passing aperture therethrough, means mounting said film transport to said frame between said projector and said screen at right angles to said light path positioned with said light path passing through said aperture, a film strip holder carried by said film transport and including a film strip driving sprocket having an axis parallel to said first direction and being rotatable on said axis for moving a film strip in a second direction at right angles to said first direction, a first drive means mounted by said means mounting said film transport and connected to said film transport, said first drive means being responsive to a signal corresponding to a component of movement of said craft in a direction related to said first direction for driving said film transport, a second drive means mounted to said film transport and connected to said film strip driving sprocket and being responsive to a signal corresponding to a component of movement of said craft in a direction related to said second direction for driving said film sprocket, a first and a second switch mounted by said means mounting said film transport and operable upon movement of said film transport in the first direction to a forward limit and a backward limit respectively, means actuated by said first switch energizing the said first drive for a predetermined movement at an accelerated rate, and means actuated by said first switch energizing said second drive for a predetermined movement at an accelerated rate.

2. A navigational apparatus for use in a piloted craft comprising, a frame, a light projector mounted at one end of the frame and having an optical axis of projection extending in the direction of the frame, a display screen mounted at the other end of said frame at right angles to and in the path of said optical axis, a turntable mounted to said frame between said projector and said screen at right angles to said axis and having an axis of rotation substantially coincident with said optical axis, said turntable having a light passing aperture therethrough and being positioned with said optical axis passing through said aperture, a first drive mounted to said frame and engaging said turntable and being responsive to craft movement for orienting said turntable relative to the direction of craft movement, a film transport mounted to said turntable and having a back and forth movement in a first direction and a light passing aperture therethrough positioned with said optical axis passing through said aperture, a film strip holder carried by said film transport and including a film strip driving sprocket having an axis parallel to said first direction and being rotatable on said axis for moving a film strip in a second direction at right angles to said first direction, a second drive mounted to said turntable and connected to said film transport and being responsive to a signal corresponding to a component of movement of said craft in a third direction for driving said film transport, a third drive mounted to said film transport and connected to said film strip driving sprocket and being responsive to a signal corresponding to a component of movement of said craft in a fourth direction at right angles to said third direction for driving said sprocket, a first and a second switch mounted to said turntable and respectively operable upon movement of said film transport in the first direction to a forward and a backward limit, and means actuated by said first switch energizing said second and said third drive for a predetermined movement at a substantially more rapid rate than said first and second rate respectively for repositioning said film strip.

3. A navigational apparatus for use in a piloted craft comprising, a frame, a light projector mounted at one end of said frame and having an optical axis of projection extending in the direction of the frame, a display screen mounted at the other end of said frame at right angles to and in the path of said optical axis, a turntable mounted to said frame between said projector and said screen at right angles to said optical axis and having an axis of rotation substantially coincident with said optical axis, said turntable having a light passing aperture therethrough and being positioned with said optical axis passing through said aperture, a first drive connected to said frame and engaging a portion of the periphery of said turntable responsive to the direction of movement of said craft orienting said turntable in a predetermined direction, a film transport mounted to said turntable and having a back and forth movement in a first direction and a light passing aperture therethrough positioned with said optical axis passing through said aperture, a film strip holder comprising first and second film spools rotatably mounted to said film transport with their axes parallel to said first direction and spaced apart in a second direction at right angles to said first direction on opposite sides of said light passing aperture through said film transport, a film strip extending between said first and second spools and having a plurality of frames in abutting end to end relationship, each frame being a transparency representing a part of a predetermined map area, said film strip extending across said optical axis and providing on said screen a projected image of a portion of said map on said film strip, a film tensioning device mounted to said film transport adjacent said first and second spools for maintaining a substantially constant tension in said film strip, a film drive sprocket rotatably mounted to said film transport between said first and second spools and parallel thereto engaging said film strip, a second drive mounted to said turntable and connected to said film transport and being responsive to a signal corresponding to a component of craft movement in a third direction related to said first direction for moving said film strip in accordance with craft movement in said third direction, a third drive mounted to said film transport and connected to said drive sprocket and being responsive to a signal corresponding to a component of craft movement in a fourth direction related to said second direction for moving said film strip in accordance with craft movement in said fourth direction, a first and a second switch mounted to said turntable and operable upon movement of said film transport in said first direction to a forward and a backward limit, means actuated by said first switch energizing said second and third drives for a predetermined amount of movement in one direction at an accelerated rate, and means actuated by said second switch energizing said second and third drives for a predetermined amount of movement in the opposite direction at an accelerated rate.

4. A navigational apparatus for displaying in a craft a map representation showing present position and comprising means receiving a signal representing earth miles travelled and deriving therefrom a signal representing map miles travelled, means receiving a signal representing true track and deriving therefrom a signal representing map grid track, means converting said signals representing map miles and map grid track into signals representing north-south and east-west components of craft movement in map miles, a display unit having a frame with a light projector mounted thereto at one end and a display screen at the other end, a film transport having a back and forth movement in a first direction and a light passing aperture therethrough, means mounting said film transport to said frame between said projector and said display screen at right angles to the path of light between said projector and said screen and positioned with said light path passing through said aperture, a film strip holder carried by said film transport and including a film strip driving sprocket having an axis parallel to said first direction and being rotatable on said axis for moving a film strip in a second direction at right angles to said first direction, a first drive mounted by said means mounting said film transport and having a driving connection with said film transport, means applying said signal representing the north-south component of craft movement to said first drive for driving said transport in accordance with said signal, a second drive mounted to said film transport and having a driving connection with said film strip driving sprocket, means applying said signal representing the east-west component of craft movement to said second drive for driving said film strip driving sprocket in accordance with said signal, a first and a second switch mounted by said means mounting said film transport and operable upon movement of said film transport in said first direction to a forward limit and a backward limit respectively, and means actuated by said first switch energizing said first drive for driving said film transport to said backward limit and energizing said second drive for a predetermined movement at an accelerated rate.

5. A navigational apparatus for displaying in a craft a projected image of a map representation of a Lambert conformal conic projection showing present position, and comprising a multiplier receiving a first signal representing earth miles travelled by said craft with respect to a reference and multiplying said first signal by a second signal representing scale factor S.F. defined by the expression $$S.F. = \frac{\cos\left(\frac{\psi_2 - \psi_1}{2}\right)}{\cos\left(\frac{\psi_2 + \psi_1}{2} - \phi\right)}$$

where $\psi_2$ is the upper standard parallel of latitude in the conic projection $\psi_1$ is the lower standard parallel of the conic projection, and $\phi$ is the map latitude of craft position, said multiplier providing as a product of the first and second signals an output of a third signal representing conformal map miles, an adder receiving a fourth signal representing true track of the craft and a fifth signal representing map convergency C defined by the expression $$C = \tan^{-1}\frac{\Delta EW}{r_1 \pm \Delta NS}$$

where $\Delta EW$ is a component of craft movement in the east-west direction with respect to said reference, $\Delta NS$ is a component of craft movement in the north-south direction with respect to said reference and $r_1$ is a constant for the map projection used representing the distance in map miles from the point of convergency to the said reference located midway in latitude between the standard parallels and substantially centrally in longitude of the area covered by the projection, said adder providing as a sum of the fourth and fifth signals a sixth signal representing map grid track, a converter for converting signals representing range and bearing with respect to said reference into signals representing components in rectangular coordinates with respect to said reference, means applying said third and sixth signals to said converter and deriving therefrom a seventh signal $\Delta EW$ and an eighth signal $\Delta NS$ in may grid miles, a display unit having a frame with a light projector mounted thereto at one end and a display screen at the other end, a film transport having a back and forth movement in a first direction and a light passing aperture therethrough, means mounting said film transport to said frame between said projector and said display screen at right angles to the path of light between said projector and said screen and positioned with said light path passing through said aperture, a film strip holder carried by said film transport and including a film strip driving sprocket having an axis parallel to said first direction and being rotatable on said axis for moving a film strip in a second direction at right angles to said first direction, a first drive mounted by said means mounting said film transport and having a driving connection with said film transport, means applying said eighth signal to said first drive for driving said transport in accordance therewith, a second drive mounted to said film transport and having a driving connection with said film strip driving sprocket, means applying said seventh signal to said second drive for driving said sprocket in accordance therewith, a first and a second switch mounted by said means mounting said film transport and operable upon movement of said film transport in said first direction to a forward limit and a backward limit respectively, and means actuated by said first switch energizing said first drive for driving said film transport to said backward limit and energizing said second drive for a predetermined movement at an accelerated rate.

6. A navigational apparatus for displaying in a craft a projected image of a map representation of a Lamber conformal conic projection showing present position, and comprising a multiplier receiving a first signal representing earth miles travelled by said craft with respect to a reference and multiplying said first signal by a second signal representing scale factor S.F. defined by the expression $$S.F. = \frac{\cos\left(\frac{\psi_2 - \psi_1}{2}\right)}{\cos\left(\frac{\psi_2 + \psi_1}{2} - \phi\right)}$$

where $\psi_2$ is the upper standard parallel of latitude in the conic projection, $\psi_1$ is the lower standard parallel of the conic projection, and $\phi$ is the map latitude of craft position, said multiplier providing as a product of the first and second signals an output of a third signal representing conformal map miles, a first adder receiving a fourth signal representing true track of said craft and a fifth signal representing map convergency C defined by the expression $$C = \tan^{-1}\frac{\Delta EW}{r_1 \pm \Delta NS}$$

where $\Delta EW$ is a component of craft movement in the east-west direction with respect to the reference, $\Delta NS$ is a component of craft movement in the north-south direction with respect to the reference, and $r_1$ is a constant for the map projection used representing the distance in map miles from the point of convergency to the said reference located midway between the standard parallels and substantially centrally of the area covered by the projection, said adder providing as a sum of the fourth and fifth signals, a sixth signal representing map grid track, a converter for converting signals representing range and bearing with respect to said reference to signals representing components in rectangular coordinates with respect to said reference, means applying said third and sixth signals to said converter and deriving therefrom a seventh signal $\Delta EW$ and an eighth signal $\Delta NS$ in map grid miles, means setting into the apparatus a ninth signal representing $r_1$, a second adder receiving said eighth and ninth signals and providing a tenth signal repreesnting $r_1 + \Delta NS$, a first resolver receiving said seventh and tenth signals and providing as an output said fifth signal representing C, a second resolver, means applying said fifth signal to said first adder and to said second resolver, means applying said tenth signal to said second resolver, said second resolver providing as an output an eleventh signal representing $$Y = \frac{r_1 \pm \Delta NS}{\cos C}$$

a distance in map miles from the point of convergency of the projection to the craft position, a converter receiving said eleventh signal and providing as an output a twelfth signal representing map latitude $\phi$ in degrees, means setting into the apparatus signals representing $\psi_1$ and $\psi_2$ as thirteenth and fourteenth signals, a scale factor resolver receiving said twelfth, thirteenth and fourteenth signals and providing as an output said second signal representing scale factor for use by said multiplier, a display unit having a frame with a light projector mounted thereto at one end and a display screen at the other end, a film transport having a back and fourth movement in a first direction and a light passing aperture therethrough, means mounting said film transport to said frame between said projector and said display screen at right angles to the path of light between said projector and said screen and positioned with said light path passing through said aperture, a film strip holder carried by said film transport and including a film strip driving sprocket having an axis parallel to said first direction and being rotatable on said axis for moving a film strip in a second direction at right angles to said first direction, a first drive mounted by said means mounting said film transport and having a driving connection with said film transport, means applying said eighth signals to said first drive for driving said transport in accordance therewith, a second drive mounted to said film transport and having a driving connection with said film strip driving sprocket, means applying said seventh signal to said second drive for driving said sprocket in accordance therewith, a first and a second switch mounted by said means mounting said film transport and operable upon movement of said film transport in said first direction to a forward limit and a backward limit respectively, and means actuated by said first switch energizing said first drive for driving said film transport to said backward limit and energizing said second drive for a predetermined movement at an accelerated rate.

7. In a navigational apparatus for displaying in a craft a projected map image from a film strip having a plurality of frames in abutting end to end relationship referred to by successive frame numbers, each frame representing a part of a Lambert conformal conic projection, said parts of said projection being arranged in rows of a predetermined number of parts abutting one another and forming a continuous strip extending across the projection, said continuous strips being in adjacent overlapping relationship with one another, adjacent parts in adjacent continuous strips being represented by frame numbers differing by said predetermined number, a display unit comprising a frame, a light projector mounted to one end of said frame and having an optical axis of projection extending in the direction of the frame, a display screen mounted to the other end of said frame at right angles to and in the path of said optical axis, a turntable rotatably mounted to said frame between said projector and said screen at right angles to said optical axis and having an axis of rotation substantially coincident with said optical axis, said turntable having a light passing aperture through which said optical axis passes, a first drive mounted to said frame and engaging said turntable for driving said turntable to a predetermined orientation, a film transport mounted to said turntable and having a back and forth movement in a first direction and a light passing aperture through which said optical axis passes, means carried by said film transport for supporting said film strip over said aperture through said film transport for longitudinal movement in a second direction at right angles to said first direction, a second drive mounted to said turntable and having a driving connection to said film transport for driving it back and forth in said first direction, and a third drive mounted to said film transport engaging said film and driving said film longitudinally for positioning said film strip longitudinally, means deriving a first signal representing a component of craft position with respect to a reference and related to said first direction, means deriving a second signal representing a component of craft position with respect to said reference and related to said second direction, means applying said first signal to said second drive and said second signal to said third drive positioning said film strip in said first and second directions in accordance with craft position and providing on said screen an image showing craft position, a first and a second switch mounted to said turntable and operable by movement of said film transport in said first direction to a forward limit and a backward limit respectively, said forward limit corresponding to a position of said film strip having said optical axis passing therethrough a predetermined distance from one side and said backward limit corresponding to a position of said film strip having said optical axis passing therethrough a predetermined distance from the opposite side, means actuated by said first switch energizing said second drive for moving said film transport at an accelerated rate to said backward limit and energizing said third drive for moving said film at an accelerated rate longitudinally in one direction by a number of frames equal to said predetermined number, and means actuated by said second switch energizing said second drive for moving said film transport at an accelerated rate to said forward limit and energizing said third drive for moving said film at an accelerated rate longitudinally in the opposite direction by a number of frames equal to said predetermined number.

8. In a navigational apparatus as defined in claim 7, means setting into said apparatus a destination position and providing a third and a fourth signal representing a component of destination position with respect to said reference and related to said first and second directions respectively, means selectively adding said first and third signals and said second and fourth signals and deriving fifth and sixth signals respectively representing the difference in components between craft position and destination position and, means applying said fifth and sixth signals respectively to said second and third drives moving said film strip at an accelerated rate and providing on said screen a map image moving directly from craft position to destination position.

9. A navigational apparatus for use in a piloted craft comprising a frame, a light projector mounted at one end of the frame, a display screen mounted at the other end of the frame in the projector light path, a film transport having back and forth movement in a first direction and a light passing aperture therethrough, means mounting said film transport to said frame between said projector and said screen at right angles to said light path with said light path passing through said aperture, a film strip holder carried by said film transport and including a film strip driving means sprocket having an axis parallel to said first direction and being rotatable for moving a film strip in a second direction at right angles to said first direction, a first drive mounted by said means mounting said film transport and connected to said film transport and being responsive to a signal corresponding to a component of movement of said craft in a direction related to said first direction, a second drive mounted on said film transport and connected to said film strip driving means and being responsive to a signal corresponding to a component of movement of said craft in a direction related to said second direction, a first and a second switch mounted by said means mounting said film transport operable upon movement of said film transport in the first direction to a forward predetermined position and a backward predetermined position respectively, means actuated by said first switch energizing said first drive for a predetermined movement at an accelerated rate moving said film transport to said backward predetermined position and operating said second switch, and relay means connected with said second switch preventing energization of said first drive while said second switch remains actuated by accelerated movement of said film transport to said backward position and permitting energization of said first drive after movement of said film transport to a position where said second switch is no longer operated by said accelerated movement.

10. A navigational apparatus as defined in claim 9 and further comprising third and fourth switches mounted adjacent said first and second switches respectively and operable upon over-travel of said film transport in the first direction past said forward and backward predetermined positions respectively, and means actuated by said fourth switch while said second switch is operated energizing said first drive for a predetermined movement at an accelerated rate moving said film transport to said forward predetermined position.

References Cited by the Examiner

UNITED STATES PATENTS

| | | | |
|---|---|---|---|
| 2,523,509 | 9/50 | Lilja | 318—468 |
| 2,814,199 | 11/57 | Waldorf et al. | 73—178 |
| 2,960,906 | 11/60 | Fogel | 88—1 |
| 3,016,791 | 1/62 | Van Inwagen | 88—24 |
| 3,087,105 | 4/63 | Hoover | 318—468 |
| 3,136,595 | 6/64 | Holt et al. | 73—178 X |

JULIA E. COINER, *Primary Examiner.*